(12) United States Patent
Quaile

(10) Patent No.: US 6,951,008 B2
(45) Date of Patent: Sep. 27, 2005

(54) EVIDENTIAL REASONING SYSTEM AND METHOD

(75) Inventor: James Patrick Quaile, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 540 days.

(21) Appl. No.: 09/821,526

(22) Filed: Mar. 29, 2001

(65) Prior Publication Data

US 2002/0165841 A1 Nov. 7, 2002

(51) Int. Cl.$^7$ .............................................. G06F 7/45
(52) U.S. Cl. ............................ 717/54; 717/56; 717/60
(58) Field of Search .............................. 706/45–47, 51, 706/52, 61, 54

(56) References Cited

U.S. PATENT DOCUMENTS

| | | | | |
|---|---|---|---|---|
| 4,754,410 A | * | 6/1988 | Leech et al. ................... | 706/45 |
| 5,058,033 A | * | 10/1991 | Bonissone et al. ............ | 706/52 |
| 5,515,477 A | * | 5/1996 | Sutherland .................... | 706/41 |
| 5,517,596 A | * | 5/1996 | Pechanek et al. ............. | 706/25 |
| 5,809,212 A | * | 9/1998 | Shasha ......................... | 706/46 |
| 5,832,465 A | * | 11/1998 | Tom ............................ | 706/51 |
| 5,982,929 A | * | 11/1999 | Ilan et al. .................... | 382/200 |
| 5,991,743 A | * | 11/1999 | Irving et al. .................. | 705/36 |
| 6,604,090 B1 | * | 8/2003 | Tackett et al. ................ | 706/11 |
| 6,801,903 B2 | * | 10/2004 | Brown et al. .................. | 707/2 |

OTHER PUBLICATIONS

"GENIUS Automated Underwriting System:Combining Knowledge Engineering and Machine Learning to Achieve Balanced Ris Assessment" Golibersuch et al., Proceedings of the 7th Innovative Applications of Artificial Intelligence Conference.*
Aug. 21–23, 1994, Montreal, Quebec, pp. 49–61.*

Chen, Y, "Fuzzy analysis of statistical evidence", IEEE Fuzzy Systems, vol. 8, isssue 6, Dec. 2000, pp–796–799.*
Guan et al, "Efficient reasoning for uncertainity management in expert systems", IEEE, AI for application, Feb. 1995, pp 333–339.*
Roehring et al, "Probabillistic reasoning using path analysis", IEEE, Uncertanilty modeling and analysis, Dec. 1990, pp 3–5.*
Gammerman et al, "Computational models for probabillistic reasoning in expert systems", IEEE, pp 1–2 May 1990.*
"A Model of Inexact Reasoning in Medicine," EH Shortliffe; BG Buchanan; Chapter 11 in Buchanan & Shortliffe, *Rule–Based Expert Systems: The MYCIN Experiments of the Stanford Heuristic Programming Project*, Addison–Wesley, MA, 1985, pp. 233–262.
"GENIUS™ Automated Underwriting System: Combining Knowledge Engineering and Machine Learning to Achieve Balanced Risk Assessment," DC Golibersuch; R. Towne; CA Wiebe, Proceedings of the Innovative Applications of Artificial Intelligence Conference, Montreal, Quebec, 1995, pp. 49–61.

* cited by examiner

Primary Examiner—Anil Khatri
(74) Attorney, Agent, or Firm—Richard DeCristofaro; Patrick K. Patnode

(57) ABSTRACT

Computerized method and system for making decisions based on evidential reasoning are provided. The method allows for providing a model structure; including a plurality of processing nodes. Each of the processing nodes is coupled to receive a set of inputs to supply a respective output. The method further allows for evaluating a respective attribute assigned to each of the plurality of processing nodes. A number of possible linguistic evidential values is specified for each of the attributes, wherein some of the evidential values comprise unknown information. A combining step allows for combining the outputs from the processing nodes to reach a decision even in the presence of unknown information.

20 Claims, 15 Drawing Sheets

D&B Mapping of Raw Data (e.g., from D&B) for Credit Agency Ratings

| 1. Very Good | 2. Good | 3. Neutral | 4. Marginal | 5. Weak |
|---|---|---|---|---|
| 5A1 | 3A2 | 5A3 | BB3 | 5A4 |
| 5A2 | 2A1 | 4A3 | CB3 | 4A4 |
| 4A1 | 2A2 | 3A3 | CC3 | 3A4 |
| 4A2 | 1A1 | 2A3 | DC3 | 2A4 |
| 3A1 | 1A2 | 1A3 | DD2 | 1A4 |
| | BA1 | BA3 | EE2 | BA4 |
| | BA2 | DC2 | FF2 | BB4 |
| | CB1 | DD1 | GG2 | CB4 |
| | CB2 | EE1 | HH2 | CC4 |
| | CC1 | FF1 | 1R2 | DC4 |
| | DC1 | GG1 | 2R2 | DD3 |
| | | HH1 | | DD4 |
| | | | NL | EE3 |
| | | | -- | EE4 |
| | | | NQ | FF3 |
| | | | ER1 | FF4 |
| | | | ER2 | GG3 |
| | | | ER3 | GG4 |
| | | | ER4 | HH3 |
| | | | ER5 | HH4 |
| | | | ER6 | 1R3 |
| | | | ER7 | 1R4 |
| | | | ER8 | 2R3 |
| | | | ERN | 2R4 |

Financial Risk (30, 32)

| Financial Performance | Exposure | Financial Risk | Comments |
|---|---|---|---|
| 1 Very Good | 1 $1-5,000 | 1 Low | Credit officers thought they know size of the company( |
| 2 Good | 2 $5001-15,000 | 2 Minimal | of net worth) before they co |
| 3 Neutral | 3 $15,001-50,000 | 3 Moderate | accurately assess the risk. |
| 4 Marginal | 4 $50,001-100,000 | 4 High | |
| 5 Unknown | 5 >$100,001 | | |
| 6 Weak | | | |

| Case | | | | |
|---|---|---|---|---|
| 1 | 1 | 1 | 1 | |
| 6 | 2 | 1 | 1 | |
| 11 | 3 | 1 | 1 | |
| 2 | 1 | 2 | 1 | |
| 7 | 2 | 2 | 1 | |
| 3 | 1 | 3 | 1 | |
| 12 | 3 | 2 | 2 | |
| 8 | 2 | 3 | 2 | |
| 16 | 4 | 1 | 2 | |
| 13 | 3 | 3 | 2 | |
| 21 | 6 | 1 | 2 | |
| 26 | 5 | 1 | 2 | |
| 4 | 1 | 4 | 3 | |
| 17 | 4 | 2 | 3 | |
| 9 | 2 | 4 | 3 | Changed from a 2 |
| 18 | 4 | 3 | 3 | |
| 22 | 6 | 2 | 3 | |
| 27 | 5 | 2 | 3 | |
| 5 | 1 | 5 | 3 | |
| 14 | 3 | 4 | 3 | |
| 23 | 6 | 3 | 4 | |
| 28 | 5 | 3 | 4 | |
| 10 | 2 | 5 | 4 | |
| 15 | 3 | 5 | 4 | Changed from a 3 |
| 19 | 4 | 4 | 4 | |
| 24 | 6 | 4 | 4 | |
| 29 | 5 | 4 | 4 | |

The approach identifies values that are outside the logic developed for the majority of cases.

In all cases they were changed one "bin" value to conform. Changes were confirmed by experts.

| Left Column | Value | Right Column | Value |
|---|---|---|---|
| GE Capital Commercial Service | Test Case 4 | The Financial performance of: | Neutral |
| House Line | $54,000.00 | Was based on: | |
| The Overall Company Rating of: | Marginal | A Quality of Financial Statement of: | Unqualified Audited |
| Was based on: | | A Financial Strength of: | Very Good |
| An Agency Rating of: | Marginal | An Age of Statement of: | 15 months |
| A Financial Risk of: | High | | |
| An Exposure of: | > $100,0001 | The Financial Strength of: | Very Good |
| A Company Risk of: | Moderate | Was based on: | |
| A Payment Quality of: | Good | A Cash Flow Risk of: | Low |
| | | A Profitability Risk of: | High |
| The Financial Risk of: | High | A Working Capital Risk of: | Medium |
| Was based on: | | A Trends Risk of: | Medium |
| A Financial Performance of: | Marginal | A Funded Debt/EBITA of: | 3-6 |
| An Exposure of: | > $100,0001 | | |
| | | The Cash Flow Risk of: | Low |
| The Company Risk of: | Moderate | Was based on: | |
| Was based on: | | An Interest Charge Coverage of: | Middle 50% |
| A Type of Company of: | Type C | A Fixed Charge Coverage of: | > 1.5 |
| An Industry Trend of: | Low | | |
| Years in Business of: | >3 | The Profitability Risk of: | High |
| Legal Issues of: | No Liens, Judgements or Suits | Was based on: | |
| A reputation of management of: | Checkered | A ROS of: | Top 25% |
| | | A ROA of: | Middle 50% |
| The Payment Quality of: | Good | An EBITA/Sales Ratio of: | Middle 50% |
| Was based on: | | | |
| An Internal historical payment of: | Good | The Working Capital Risk of: | Medium |
| A Current Aging of: | All other | Was based on: | |
| A D&B Paydex of: | 11-30 days slower (or Unknown) | A Sales/Working Capital Ratio of: | Middle 50% |
| A Trade EDI of: | 10-20 days slow | A Quick ration of: | Middle 50% |
| | | A Current ration of: | Bottom 25% |
| The Internal Historical Payment of: | Good | | |
| Was based on: | | The Trends Risk of: | Medium |
| A Weighted Monthly Average of: | 11-20 days slow | Was based on: | |
| A Payment Trend of: | 24% to -24% (or Unknown) | A Profitability of: | Maintaining |
| | | A Sales of: | > 15% |

EVIDENTIAL REASONING SYSTEM AND METHOD

BACKGROUND OF THE INVENTION

The present invention relates generally to expert systems, and, more particularly, to a computerized method and system for making decisions based on evidential reasoning, such as may be used for making decisions regarding risk and credit analysis for financial service applications.

Evidential reasoning is an artificial intelligence methodology that generally starts with a hierarchical description of a decision process used in a particular field, such as business, engineering, medical diagnostics, etc. The hierarchical description is used to develop a model structure represented by a plurality of processing nodes. Each node in the model structure represents an intermediate or final consideration and opinion used in the decision process. Each node contains a number of attributes describing factors to be considered for that node. Each attribute has a number of possible linguistic evidential values. The linguistic evidential values are converted to numeric evidential values at the nodes. The numeric evidential values express a degree to which the linguistic evidential values support a particular hypothesis for the attributes. For example, there can be a high belief, a medium belief, or a low belief that the linguistic evidential values support the hypothesis. The numeric evidential values for all of the attributes in a node are combined and used to formulate an opinion for the node. The opinion from each node is then propagated to the next higher level node where it becomes the linguistic evidential value for the appropriate attribute in that higher level node. The linguistic evidential values at the higher level nodes are then converted to numeric evidential values and combined at the nodes to formulate additional opinions. This process continues until a final opinion is formulated at the highest level node in the model structure.

The combination of the numeric evidential values at the nodes to formulate an opinion may be accomplished by using a non-linear algorithm. The Mycin function is one type of non-linear algorithm that has been used to combine numeric evidential values. The Mycin function resembles a special case in the Dempster-Schaffer Theory of Evidence. The Mycin function is adapted from the certainty theory work formulated by Shortliffe et al., A Model of Inexact Reasoning in Medicine. See Chapter 11 in Buchanan & Shortliffe, Rule-Based Expert Systems: The Mycin Experiments Of The Stanford Heuristic Programming Project, Addison-Wesley, MA, 1985.

One area of interest to the assignee of the present invention is the ability to participate in electronic commerce (eCommerce) business ventures by offering financial services over a global communications network such as the Internet. It is believed that one key consideration to succeed in this area is the ability to systematically and reliably estimate the financial risk involved in any given offering prior to committing resources to that offering. Another consideration is to quickly make any such estimates and make appropriate decisions with minimal human intervention, such as may be implemented with a computerized system. In particular, it would be desirable to offer financial services associated with electronic business-to-business (B2B) transactions through a global communications network. As suggested above, one key element in this strategy is the ability to quickly and inexpensively yet systematically and reliably evaluate risk and assign appropriate lines of credit. Thus, it would be desirable to provide computerized techniques for developing a comprehensive, quantitative underwriting model and risk rating methodology that can be used over a global communications network to evaluate credit requests and assign credit lines.

Modeling approaches may differ depending on the complexity of the decision to be made and the amount of good historical data available. For example, if there is access to large volumes of good quality historical data that characterize good and bad credit risks, then models are typically developed using statistical regression, neural nets, data mining or other mathematical techniques that analyze large data sets. Model development in the absence of data, however, typically requires advanced analytic techniques to evaluate and manage information in order to make strategic decisions or recommendations. In these situations, one key objective is to gather enough information and evidence in support of a final decision or rating. As will be appreciated by those skilled in the art, the computerized analysis of credit request information is a challenging activity, since it requires emulating the thought process of expert analysts, and such analysis typically involves the use of judgement in aggregating facts or evidence about a particular situation. For credit decisions, evidence indicating the financial strength, company quality, payment history, credit agency ratings, etc. are combined to determine an appropriate line of credit. See U.S. patent application Ser. No. 09/820,675 (RD-28,220), titled "Computerized Method For Determining A Credit Line" and filed concurrently herewith, for background information regarding an innovative technique that allows to quickly and systematically determine a credit line to be issued by a financial service provider to any given business applicant entity.

The act of forming a judgement involves balancing countervailing factors to arrive at a decision. Judgement involves not just culling out the obviously bad cases or accepting the obviously good cases, but making the proper decision in the gray area in the middle. In general, the weight or importance of a particular piece of evidence is not fixed but is dependent on the values of the other items being aggregated. U.S. Pat. No. 5,832,465, commonly assigned to the assignee of the present invention, discloses a technique for building a self-learning evidentiary reasoning system that facilitates the capture of the experts thought processes and encapsulate them in an computer-based model configured to give expert advise. The present invention further improves the foregoing technique to enable automated decision making, particularly, in situations when there are missing pieces of evidence.

BRIEF SUMMARY OF THE INVENTION

Generally, the present invention fulfills the foregoing needs by providing in one aspect thereof, a computerized method for making decisions based on evidential reasoning. The method allows for providing a model structure including a plurality of processing nodes. Each of the processing nodes is coupled to receive a set of inputs to supply a respective output. The method further allows for evaluating a respective attribute assigned to each of the plurality of processing nodes. A number of possible linguistic evidential values is specified for each of the attributes; some of the evidential values comprise unknown information. A combining step allows for combining the outputs from the processing nodes to reach a decision even in the presence of unknown information.

The present invention further fulfills the foregoing needs by providing in another aspect thereof, a computerized method for making decisions based on evidential reasoning. The decisions are used for risk and credit analysis of financial service applications. The method allows for providing a hierarchical model structure for performing risk and credit analysis of financial service applications. The model structure includes at least one input layer of processing nodes. The model further includes an output layer having a processing node coupled to each of the processing nodes in the input layer. The method further allows for evaluating a respective attribute indicative of a risk factor assigned to each of the plurality of processing nodes. A number of possible linguistic evidential values is specified for each of the attributes; some of the evidential values comprise unknown financial information. A combining step allows for combining the outputs from the processing nodes to reach a decision regarding a given financial service application even in the presence of the unknown information. The combining step is configured to emulate expert data collected during a learning stage from a plurality of examples for each of the processing nodes. Each of the plurality of examples has a set of inputs, including some indicative of unknown financial information, and a corresponding output indicative of an expert opinion.

BRIEF DESCRIPTION OF THE DRAWINGS

FIG. 5 shows an exemplary mapping table that may be used to map available raw data for one of processing nodes, e.g., the "Credit Agency Ratings" processing node.

FIG. 11 illustrates a spreadsheet, such as that of FIG. 8, including examples where the expert opinion was adjusted upon the system having identified that such expert opinion deviated from the majority of the examples comprising the expert data.

FIG. 15 illustrates an exemplary report that may be generated by the system to describe the various interrelationships of the processing nodes in response to a given set of inputs.

Figure 1:
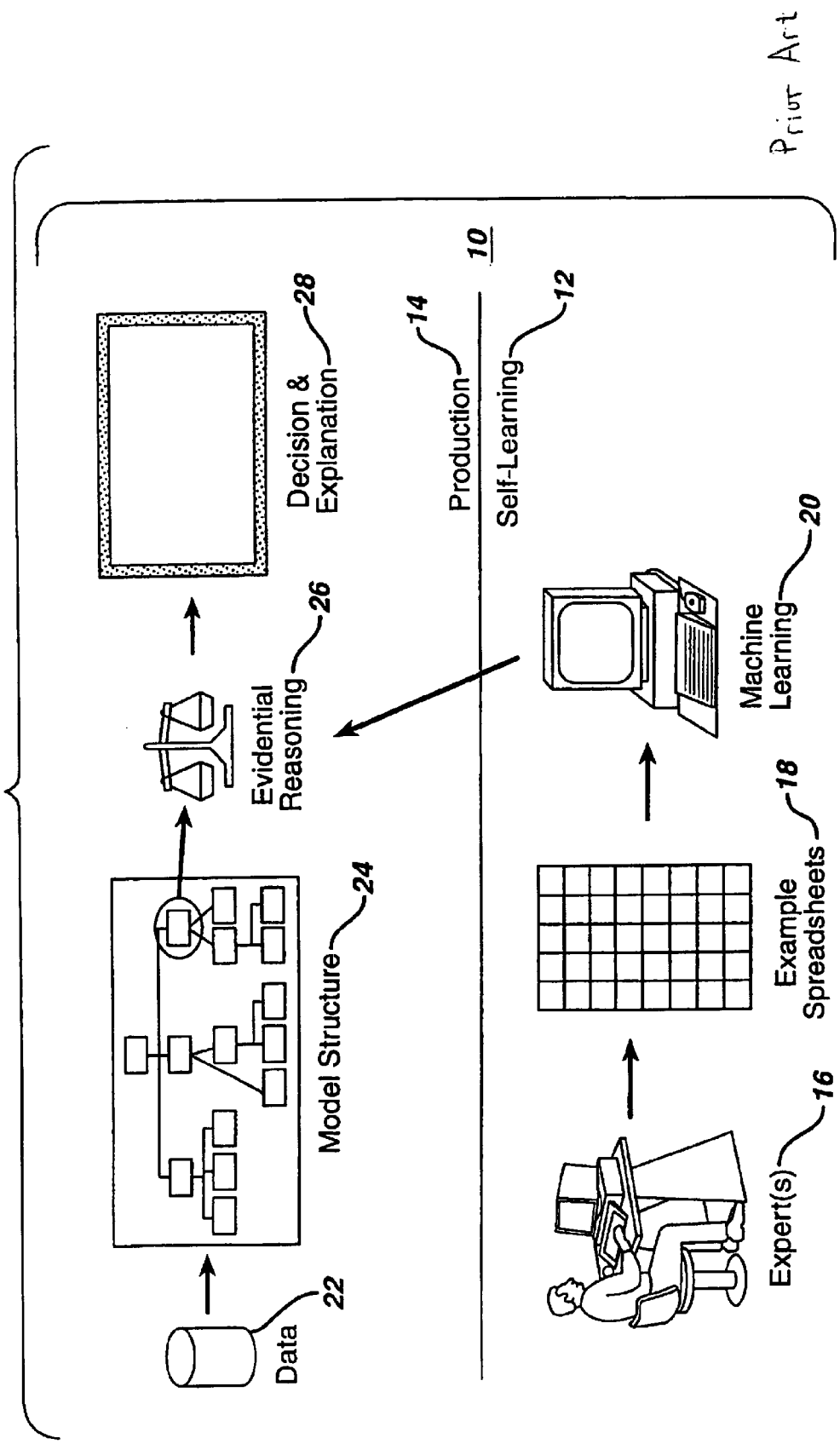
FIG. 1 shows a block diagram of an example-based evidential reasoning system according to the Prior Art.

Before any embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

FIG. 1 shows a block diagram of an example-based evidential reasoning system 10 according to the Prior Art. The example-based evidential reasoning system 10 includes a training or self-learning phase 12 and a production phase 14. In the self-learning phase 12, the knowledge of experts 16 in a particular field of interest, such as business, engineering, diagnostics, manufacturing, etc., is acquired and used to develop a knowledge base. For purposes of illustrating this invention, the particular field that is described herein is business related. More specifically, the present invention is described in the context of risk analysis of financial service applications for determining a line of credit requested by a business entity. This invention, however, is not limited to credit risk analysis and can be used in other fields of business as well as in other fields such as science, medicine, engineering, etc. Thus, in the illustrative embodiment, expert knowledge in the field of analyzing financial service applications for credit risk analysis is captured. The experts define a hierarchical model structure of the decision logic used to analyze the risk of a financial service application. In this embodiment, the model structure has an input layer of processing nodes and an output layer having a processing node coupled to each of the input layer processing nodes.

After the model structure has been defined, a number of attributes, each describing a respective factor to be considered in the risk analysis, is specified for each processing node. In one exemplary embodiment, one creates a random sample of possible input combinations for the processing nodes. The random sample is then supplied to experts in the field of interest so as to capture their opinion regarding the supplied random sample. The expert would conveniently assign a linguistic value output for each given example provided in the random sample. Thus, it will be appreciated that one advantageous feature of the present invention is the fact that such experts would not be overburdened during the development stage since the experts would simply be asked to given respective opinions, such as those they routinely issue in their day-to-day affairs. The examples are entered directly into computer-readable example spreadsheets 18. The example spreadsheets are then transferred into a processing machine 20, such as a personal computer or workstation, where the examples are used to learn the decision process used by the experts to analyze a financial service application. More specifically, an understanding is developed on how the linguistic evidence values are combined at each node and on how the combined evidence values are interpreted. After this understanding has been learned, it is then used in the production phase 14. During the production phase 14 data is transferred from a data storage unit 22 and entered into the example-based evidential reasoning system. In particular, data from a financial service application is entered into the model structure 24 and the system 10 then weighs the evidence in the application at the evidential reasoning unit 26 according to what has been learned in the self-learning phase. A decision is then made available through a suitable display unit 28.

Figure 2:
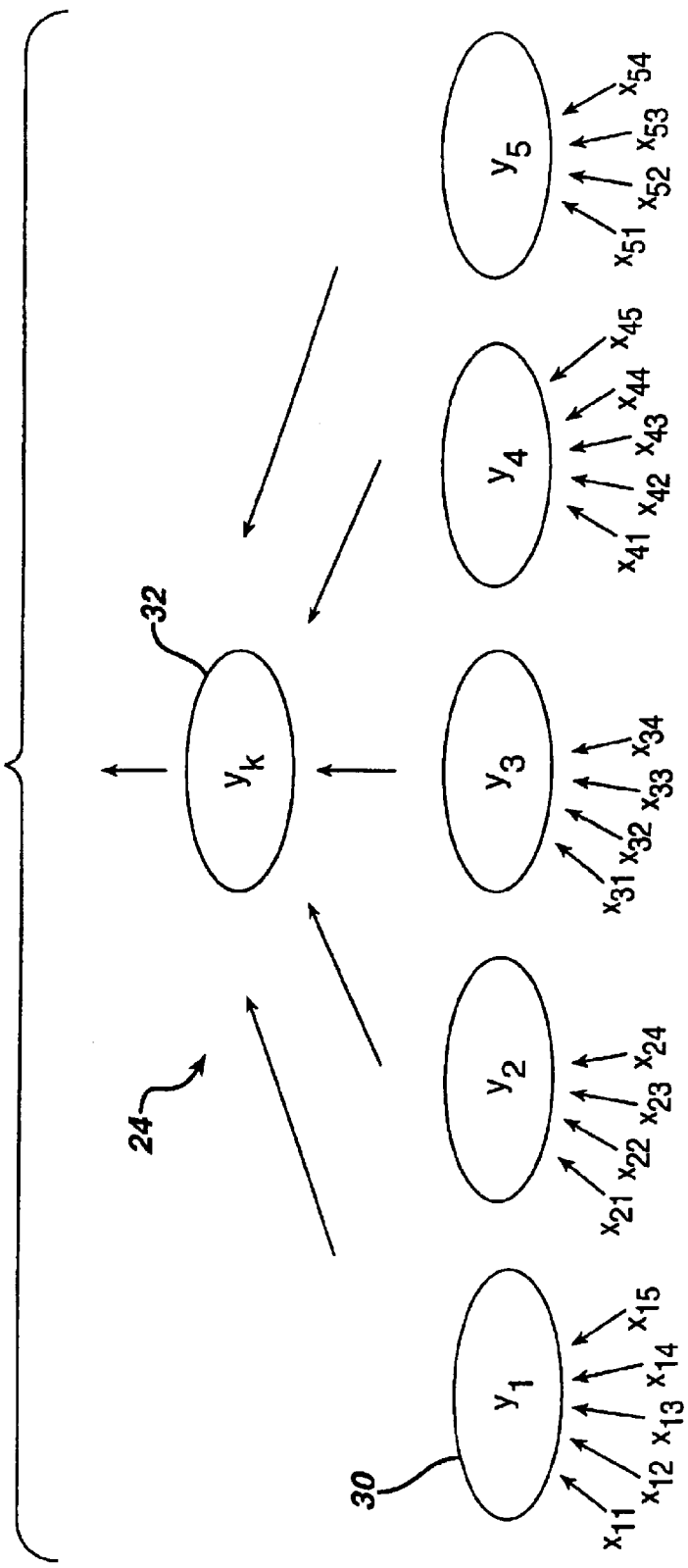
FIG. 2 shows a generic model structure according to the Prior Art that may be configured to make decisions in a variety of applications, such as processing of financial service applications.
Figure 3:
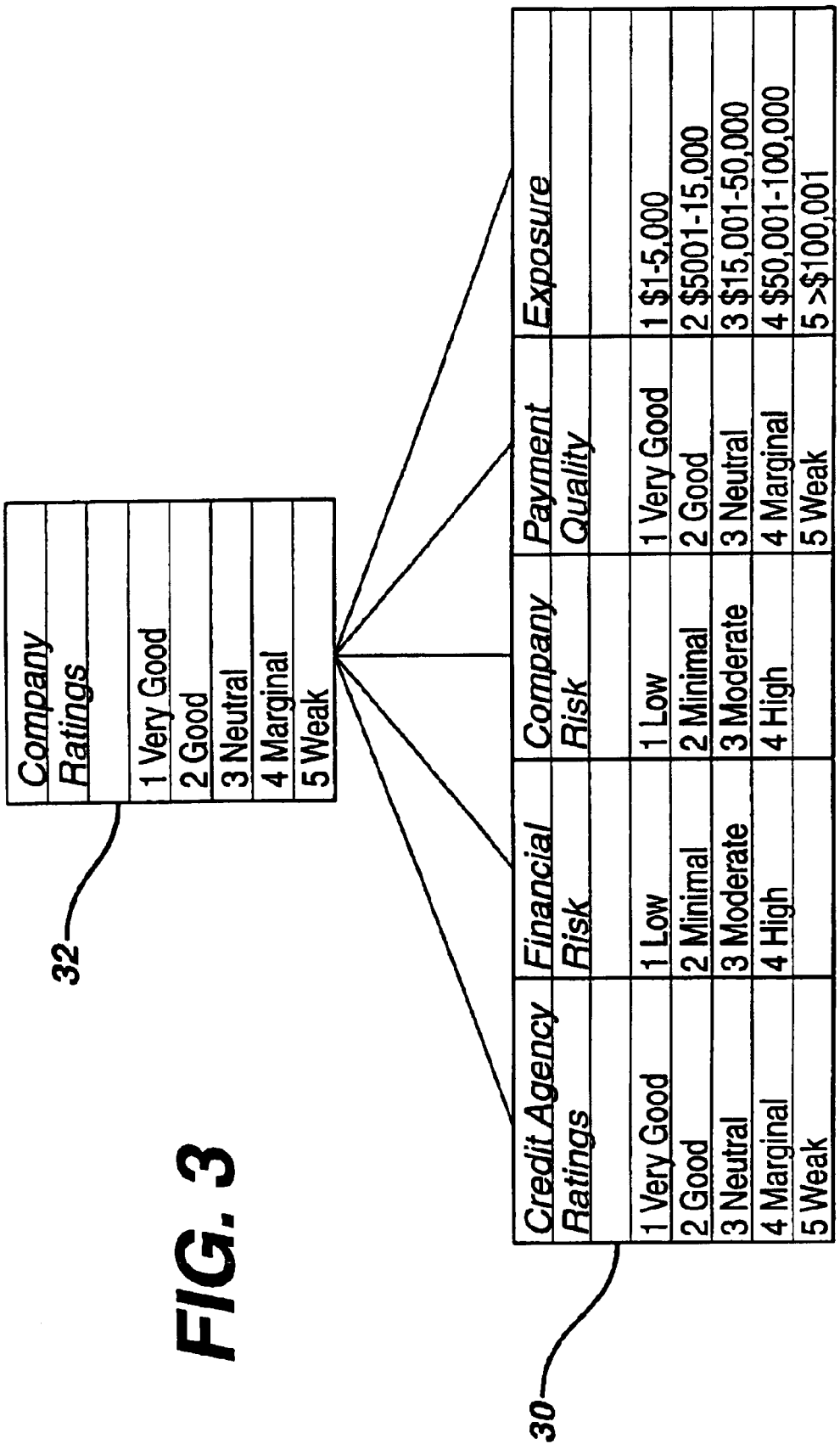
FIG. 3 shows the model structure of FIG. 2 with input processing nodes configured to receive linguistic evidential data for a given financial service application.

FIG. 2 shows a generic model structure 24 according to the Prior Art that may be configured to analyze a financial service application. The model structure includes an input layer of processing nodes 30 and an output layer having a processing node 32 connected to each of the input layer processing nodes. Each processing node in the input layer receives linguistic evidential data for a given financial service application. The linguistic evidential data is preprocessed and organized into a plurality of groups that in one illustrative embodiment, as shown in FIG. 3, may comprise credit agency ratings, financial risk, company risk, payment quality, and magnitude of financial exposure. The linguistic evidential data are then applied to the input layer of processing nodes 30. In the illustrative embodiment, the input layer comprises five different processing nodes that receive respective linguistic evidential data corresponding to a specific group. For example, for the generic model structure shown in FIG. 2, processing node $Y_1$ would receive linguistic evidential data (e.g., $x_{11} \ldots x_{15}$) for the credit agency ratings group; processing node $Y_2$ would receive linguistic evidential data (e.g., $x_{21} \ldots x_{24}$) for the financial risk group; processing node $Y_3$ would receive linguistic evidential data (e.g., $x_{31} \ldots x_{34}$) for the company risk group; processing node $Y_4$ would receive linguistic evidential data (e.g., $x_{41} \ldots x_{45}$ for the payment quality group; and processing node $Y_5$ would receive linguistic evidential data (e.g., $x_{51} \ldots x_{54}$) for the financial exposure group.

Exemplary attributes of the linguistic evidential data may be as shown in FIG. 3. Each of the processing input nodes has associated therewith a set of possible linguistic evidential values. For example, the possible set of linguistic evidential values for the "Credit Agency Ratings" input processing node comprises "Very Good", "Good", "Neutral", "Marginal" and "Weak". The possible set of linguistic evidential values for the "Financial Risk" input processing node comprises "Low", "Minimal", "Moderate", and "High". The possible set of linguistic evidential values for the "Company Risk" input processing node comprises "Low", "Minimal", "Moderate", and "High". The possible set of linguistic evidential values for the "Payment Quality" input processing node comprises "Very Good", "Good", "Neutral", "Marginal" and "Weak". The possible set of linguistic evidential values for the "Financial Exposure" input processing node comprises the various monetary ranges shown therein. It will be appreciated that the possible set of linguistic evidential values for these input processing nodes are not limited to the foregoing values and may have other values if desired.

Each input processing node translates the linguistic evidential data into a numeric value and combines the numeric values into an aggregate evidential data value. The aggregate evidential data value is then mapped to a linguistic evidential data. The linguistic evidential data is then transferred from each input layer processing node to the output layer processing node 32 and used as an input. The output layer processing node then translates the linguistic evidential data into a numeric value and combines the numeric values into an aggregate evidential data value. Then the aggregate evidential data value is mapped to a linguistic evidential data value, which is the final output of the model structure. As shown in FIG. 3, processing node 32 comprises "Company Ratings" and a potential set of outcome possibilities may comprise "Very Good", "Good", "Neutral", "Marginal" and "Weak". The model structure can take the form of another structure and is not limited to the illustrative representation disclosed herein. More specifically, the hierarchy of the model structure depends on the particular field of use and decision process used by experts in that area.

As suggested above, Example-Based Evidential Reasoning (EBER) is an analytical technique that processes linguistic evidence values from various sources and produces a linguistic evidence value as output. This involves translating the source evidence from linguistic to numeric value. Then applying a suitable evidence aggregation function to the numeric evidence values, and finally mapping the numeric aggregate value to a linguistic output. As shown in FIGS. 2 and 3, the model structure could be a simple input layer and an output layer coupled to one another to perform all of the functions above, or it could be a complex hierarchical multilayer model structure, where an output evidence value produced at one node of the model structure could be the input evidence value to an intermediate processing node of the model structure.

Figure 4:
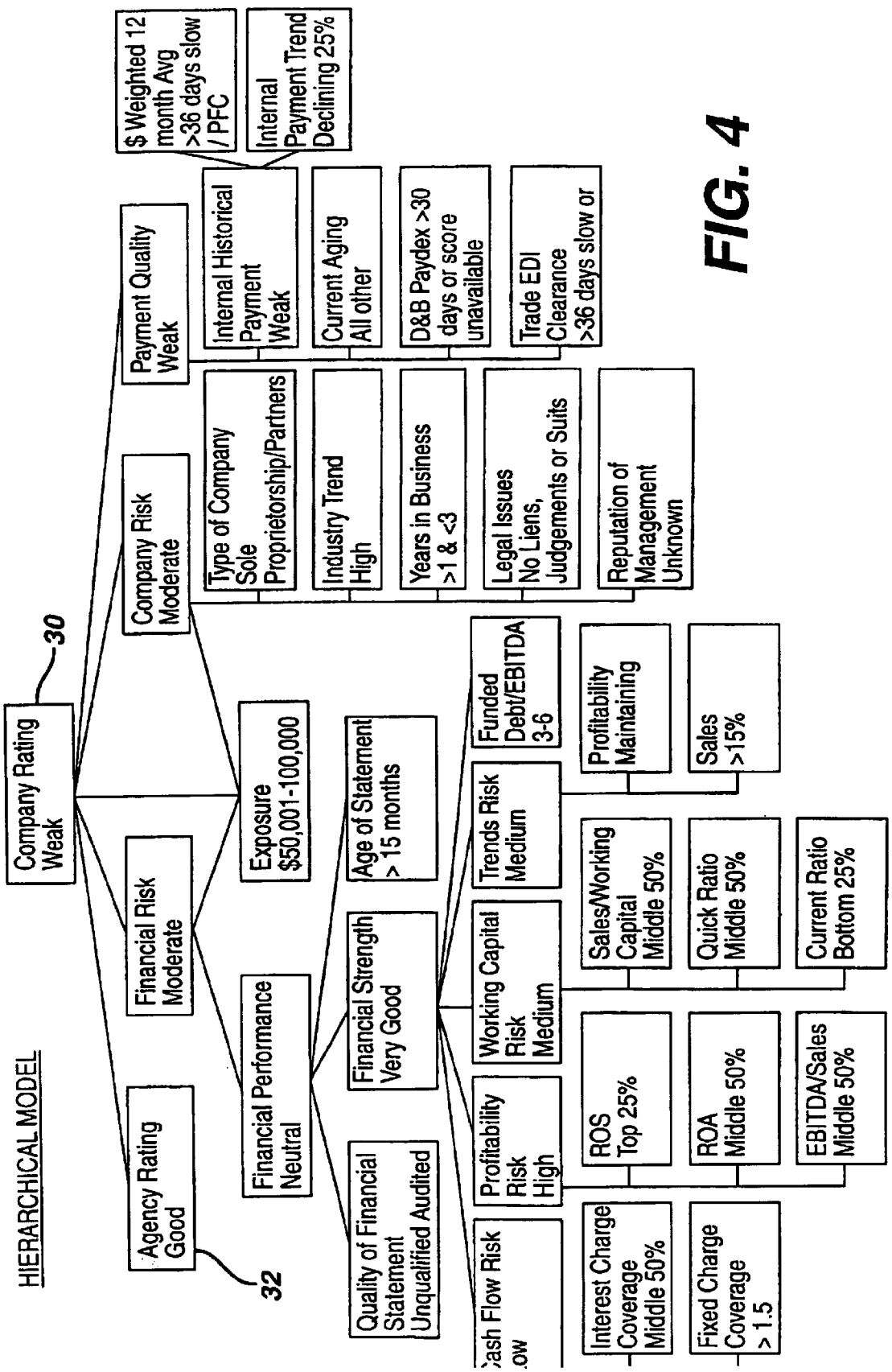
FIG. 4 shows an exemplary hierarchical model for making decisions regarding credit risk and analysis in accordance with one aspect of the present invention.

One exemplary hierarchical model for estimating credit risk analysis in accordance with one aspect of the present invention is shown in FIG. 4. The parameters of the model structure are the translation functions that translate source linguistic evidence to numeric values, as well as the mapping functions applied to the aggregate values to arrive at linguistic outputs. These parameters of the model structure should be optimized to best reflect expert opinion based on example data supplied by the experts. One challenge of building a suitable EBER model structure is to produce an optimal set of functional parameters for the model structure, or any part of a hierarchical model structure, given the example data of various experts. The credit risk scoring model illustrated in FIG. 4 was in part developed by taking into consideration the opinion of a team of credit experts. The team approach to develop such hierarchical model structure was to identify processing nodes representing key concepts or facts that, in their expert opinion, statistically contribute to the determination of the credit line. The Company Ratings is determined through evidential reasoning by aggregating evidence organized in a hierarchical tree structure. At the top of the tree, the Company Ratings is determined by considering data from the following five processing nodes:

Credit Agency Ratings

Financial Risk of the company being rated—based on financial statement information Company Risk—based on factors other than financial performance Payment Quality—how well does the company pay its debts Exposure—amount of money at risk if the credit line is approved As will be appreciated by those skilled in the art, collecting and processing evidence based on "Credit Agency Ratings" and "Financial Exposure" is relatively straightforward while other processing nodes, e.g., "Financial Risk", "Company Risk", "Payment Quality", may be more complex and may require decomposition into respective branches and/or sub-branches. For example, the "Financial Risk" processing node receives evidence data from a first layer made up of two different processing nodes, i.e., the "Financial Exposure" node and the node labeled as "Financial Performance". The financial performance node in turn receives evidence data from a second layer made up of three different processing nodes, i.e., "Quality of Financial Statements", "Financial Strength", and "Age of Statement". In turn, the "Financial Strength" processing node receives evidence from a third layer made up of five different processing nodes, such as "Cash Flow Risk", "Profitability Risk", "Working Capital Risk", "Trends Risk", and "Funded Debt". Further details of the branch and sub-branches that make up the "Financial Risk" processing node are shown in FIG. 4 together with the resultant tree of additional branches, such as the respective branches that make up the respective "Company Risk" and "Payment Quality" nodes. Thus, it will be appreciated that evidence data for the overall "Company Ratings" is sequentially rolled-up or aggregated from the lower-most layer to the upper-most layer. It will be understood that the concept of top-most and bottom-most layers should be taken figuratively and not literally since one can envision situations where the tree could be arranged in other architectural configurations, e.g., from left to right, etc.

In one exemplary embodiment, the present credit scoring model may process approximately 30 different pieces of information, although not all of them are necessarily required in every situation. The information may be collected from various sources generally available to subscribers and well-known by those skilled in the art. Examples of the sources of information may be as follows:

From Databases of Commercial Services
    Payment related information
        Weighted 12 month Avg
        Internal Payment trend
    Exposure
        With new line included
    Credit
        Internal High Credit From Databases of Credit Services
    Payment related information
    Current Aging
    Dun & Bradstreet (D&B) Paydex
    Electronic Data Interchange (EDI) Clearance
    Average High Credit
    High Credit
    Credit Agency Report(s)
    D&B From Databases Indicative of Company Information
    Type of Company
    Industry Trend
    Years in Business
    Legal issues
    Reputation of management From Databases of Financial Information Sources
    Calculated from financial statements
        Sales/Working Capital*
        Quick Ratio*
        Current Ratio*
        Profitability Trend*
        Sales Trend
        Return On Sales*
        Return On Assets*
        EBITDA/Sales or Ratio of Earnings before interest, taxes, depreciation and amortization to Sales*
        Funded Debt/EBITDA or Ratio of Funded debt to Earnings before interest, taxes, depreciation and amortization to Sales
        Fixed Charge Coverage
        Interest Charge Coverage*
        Quality of financial Statement
        Age of Statement
        Net Worth
        Working Capital

*Pieces of information marked with an asterisk may be related to commonly recognized industry ranking standards (e.g., top 25%, Middle 50% or Bottom 25%)—which may be available from Risk Management Association, (formerly known as Robert Morris Associates) or equivalent.

The "value" of the evidence at each leaf or input processing node may be obtained by mapping any available raw data into the linguistics of the node. As suggested above, the "Financial Exposure" processing node is described by monetary ranges which makes mapping raw data easy. In some situations, however, the raw data may require some initial processing to ensure compatibility with the definitions assigned to a given processing node. For example, as shown in FIG. 5, a mapping table 75 may be used to map the available raw data for the "Credit Agency Ratings" processing node. As will be appreciated by those skilled in the art, the raw data may comprise a plurality of codes generally supplied by D&B (or other suitable purveyor of credit information) in their standard credit reports. For example, in table 75, the group of codes made up of codes 5A1, 5A2, 4A1, 4A2 and 3A1 would be mapped as "Very Good". Similarly, the group of codes made up of codes 3A2, 2A1, 2A2 . . . to Code DC1 would be mapped as "Good". It will be appreciated that the present invention is not limited to the illustrative mapping shown in FIG. 5.

Figure 6:
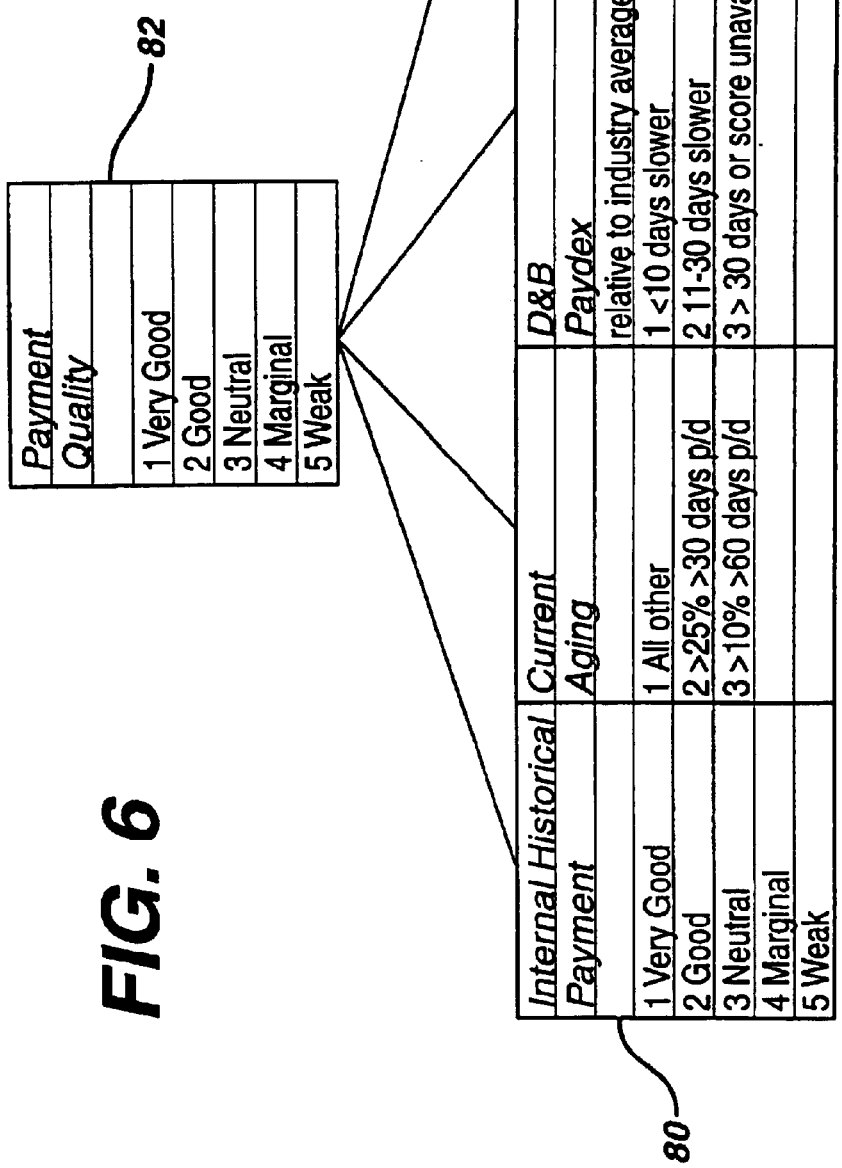
FIG. 6 illustrates exemplary details for one of the intermediate processing nodes of the hierarchical model of FIG. 4, such as the "Payment Quality" processing node.

As shown in FIG. 6, intermediate processing nodes, such as the "Payment Quality" processing node, generally comprise an output processing node 82 coupled to its supporting input layer 80 of processing nodes. In this case, input layer 80 provides evidence aggregated to processing node 82. In this case, the payment quality node is determined by the evidence values from the four sub-nodes shown in FIG. 5. That is, the sub-nodes made up of Internal Historical Payment, Current Aging, D&B Paydex, and Trade EDI Clearance.

Once the model structure has been designed and all the required pieces of evidence have been identified the next step is linguistic mapping. The potential "values" of evidence at each node may be described in words, alphanumeric characters or other symbols used by the experts while evaluating or discussing credit requests.

The translation of source linguistic evidence to a respective numeric value is a straightforward one-to-one correspondence, and may be implemented with respective look-up tables. It will be appreciated that the possible set of values of the source linguistic evidence should be based on any appropriate lexicon used by experts in the field of interest. In one exemplary embodiment, the numeric values corresponding to the linguistic evidence range between −1.0 and 1.0, and constitute the parameters to be optimized. The following is an example of source evidence translation:

If linguistic evidence is "High", then evidence value is 0.8
If linguistic evidence is "Moderate", then evidence value is 0.5
If linguistic evidence is "Minimal", then evidence value is 0.1

If linguistic evidence is "Low", then evidence value is −0.3

In this exemplary embodiment, the evidence aggregation function is the one used in the Mycin experiments (Shortliffe & Buchanan, 1985). Given that the value of the inputs to this function are between −1.0 and 1.0, it can be shown that the aggregate functional value would be similarly between −1.0 and 1.0. More specifically, the following mathematical equations describe the Mycin type evidence aggregation function:

$$f(x, y) = \begin{cases} x + y(1-x) & x \geq 0, y \geq 0 \\ \dfrac{x+y}{1-\min(|x|,|y|)} & xy < 0 \\ -f(-x, -y) & x < 0, y < 0 \end{cases}$$

Figure 7:
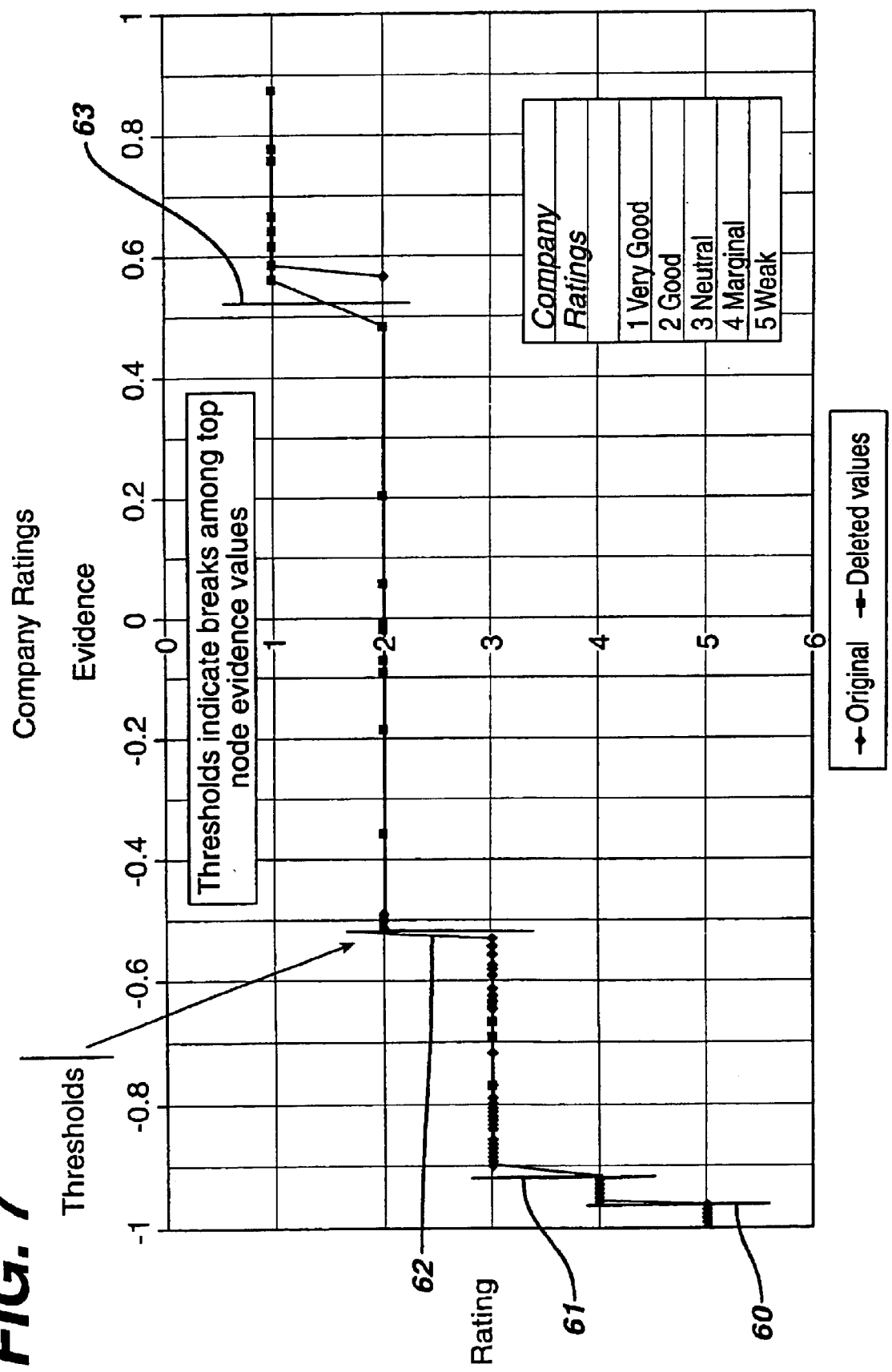
FIG. 7 illustrates a plurality of exemplary non-overlapping intervals over a possible output space of the data structure of FIG. 4.

As illustrated in FIG. 7, in one exemplary embodiment the mapping of the aggregate values to linguistic output involves separating the possible output space into discrete non-overlapping intervals. As shown in FIG. 7, a single linguistic value or interpretation is assigned to each of the identified intervals. Thus, an aggregate value would fall in only one of these intervals, and the corresponding linguistic output can then be assigned. Each aggregate value is optimized to maximize separation between any two adjacent intervals. Care, however, should be exercised to ensure that such separation is statistically maximized for each possible adjacent interval and not just for one or a few of such intervals. Thus, in one exemplary embodiment, the optimization technique may use a standard deviation measurement to ensure that the separation spread between each adjacent interval is, from an statistical point of view, essentially equally distributed. Once the values of the non-overlapping intervals have been computed, one can assign a plurality of thresholds e.g., thresholds 60–63, at a suitable location interposed between any two non-overlapping intervals. As seen in FIG. 5, the following is an example of aggregate value mapping into linguistic output:

If the aggregate value is greater than threshold 63 that corresponds to a value of about 0.53, then the linguistic output is "Very Good".

If the aggregate value is between thresholds 62 and 63, respectively corresponding to values −0.52 and 0.53, then linguistic output is "Good". Similar mapping may be readily performed for the remaining linguistic outputs illustrated in FIG. 7.

As suggested above, optimizing the EBER system generally requires the determination of both the source translation as well as the output mapping such that system outputs closely match the example data supplied by the experts. In one exemplary embodiment, this action is accomplished by creating a random subset of examples for the source or input values and having the experts map each case to a respective linguistic output, as shown in the example spreadsheet 16 of FIG. 8. The opinions of the experts are used to determine the appropriate evidence value allocation for each of the linguistic input values so that the aggregate evidence for the output maps to the expert opinion.

Figure 8:
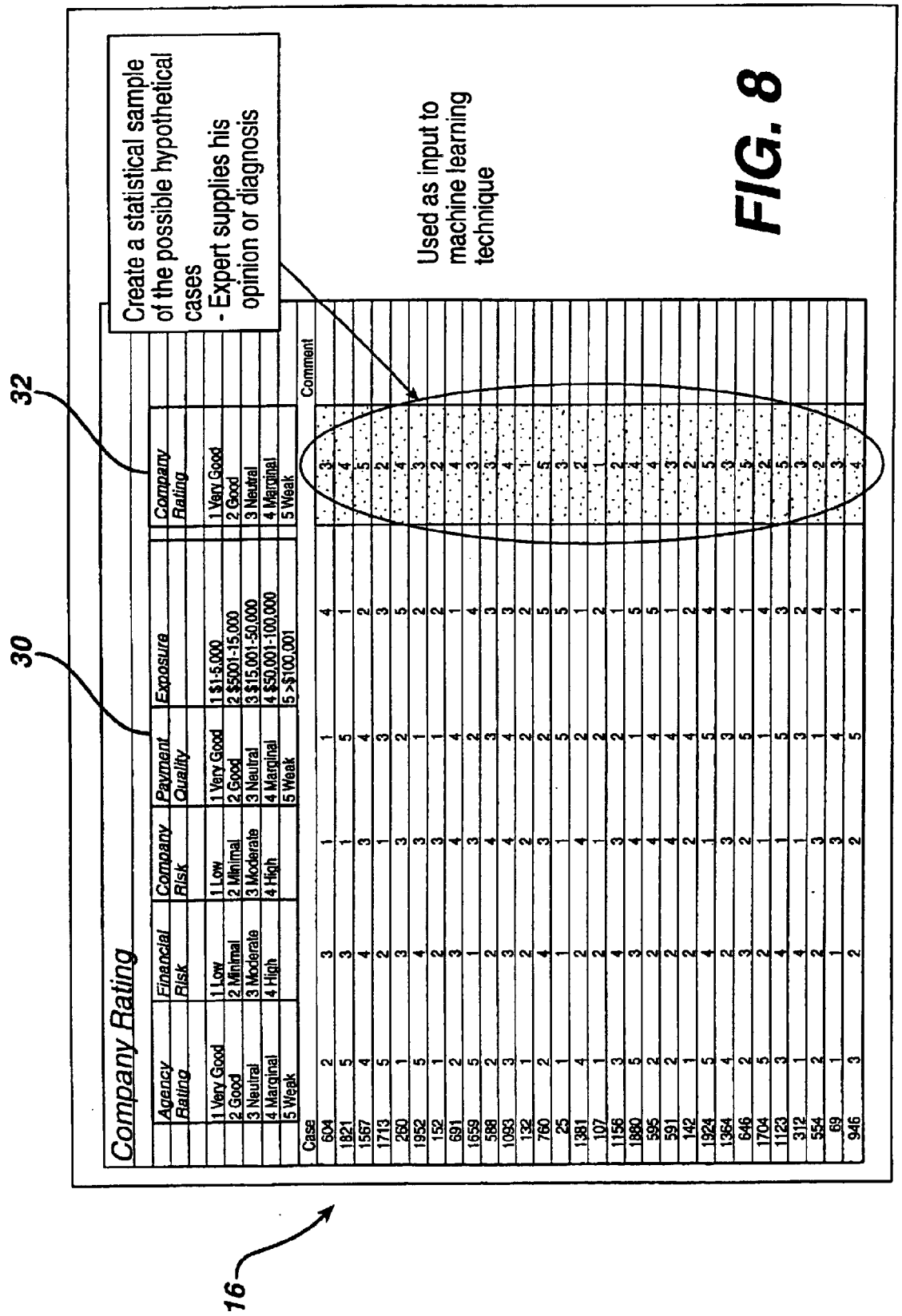
FIG. 8 illustrates an exemplary spreadsheet for collecting expert data for a plurality of examples, such as hypothetical examples or based on historical data of previously processed applications.

As shown in FIG. 8, for case 604, an expert (or a team of experts) indicates that assuming Credit Agency Ratings is Good; Financial Risk is Moderate; Company Risk is Low; Payment Quality is Very Good; and the level of financial exposure is no more than $5000, then, the Company Ratings assigned by that expert would be Neutral. Similarly, for case 132, the expert indicates that assuming Credit Agency Ratings is Very Good; Financial Risk is Minimal; Company Risk is Minimal; Payment Quality is Good; and the level of financial exposure is from $5000 to $15000, then, the Company Ratings assigned by that expert would be Very Good.

Figure 9:
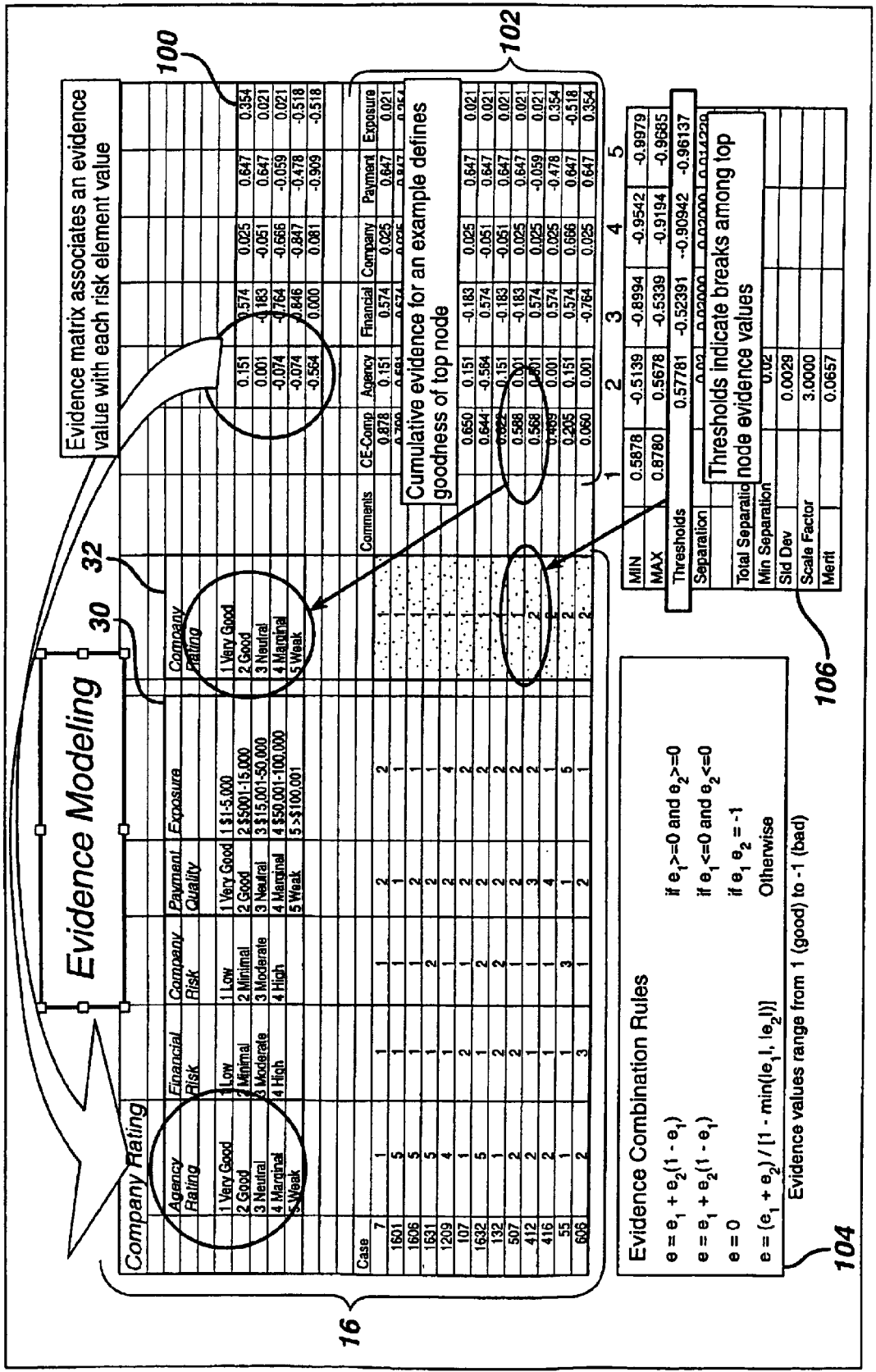
FIG. 9 illustrates a processing tool, such as a Excel workbook, appropriately configured to determine the optimum numerical values to be assigned to the linguistic evidential data for each processing node, and to determine maximum interval separation in the possible output space.

In one exemplary embodiment, the processing of the expert example data collected from each entry in spreadsheet 16 (FIG. 8), may be accomplished by a standard computer-readable spreadsheet application, such as an Excel workbook as shown in FIG. 9, appropriately configured with Visual Basic macros and processing code in a computational tool thereof, such as the Excel Solver tool, to determine the optimum numerical values to be assigned to the linguistic evidential data for each processing node, and to further determine the plurality of thresholds separating the output values.

As shown in FIG. 9, an evidence matrix 100 allows for associating a respective numeric value with each linguistic attribute processed by each input processing node 30. Numerical evidence matrix 100 may be initially filled with numerical values empirically and/or experimentally derived by the experts. At this point, such numeric values would generally comprise non-optimal initial values. It will be appreciated, however, that as the computational tool is operated, such values would be appropriately adjusted to reflect maximization of output interval separation as well as compliance of the evidence aggregation function. By way of example, each of the five elements in the first column of matrix 100 is associated with a respective linguistic attribute of the "Credit Agency Ratings" processing node. For example, the numeric value of 0.151 is associated with the "Very Good" attribute for that processing node. The numeric value −0.564 is associated with the "Weak" attribute for that processing node. Similarly, each of the four elements in the second column of matrix 100 is associated with a respective linguistic attribute of the "Financial Risk" processing node. For example, the numeric value 0.574 is associated with the "Low" attribute for that processing node. The numeric value −0.846 is associated with the attribute "High" for that processing node. From the above matrix, it will be appreciated that consistent with the Mycin aggregation function, the evidence values are bounded between 1 and −1. Further, the numeric values should be assigned in sequentially decreasing/increasing order to logically correspond to the linguistic attributes. For example, if "Very Good" is the top-most attribute and that attribute is followed by "Good", which in turn precedes the "Neutral" attribute, then the numeric value assigned to "Very Good" should be the most positive value, assuming the presence of that attribute is being determined, or should be the most negative value assuming the absence of that attribute is being determined. The numeric value for "Good" should have a value somewhere intermediate between the respective numeric values for "Very Good" and "Neutral". It will be appreciated that in some cases two neighboring linguistic attributes may share the same numeric value.

A cumulative evidence matrix 102 results from application of the aggregation function, e.g., the Mycin aggregation function, as represented in aggregation module 104, to each of the entries indicative of example data in spreadsheet 16. For simplicity of illustration, spreadsheet 16 (FIG. 9) only lists an excerpt of all the example cases analyzed by the experts. A more detailed list of example data is available in Appendix A. In matrix 102, the column labeled as CE-Comp represents cumulative evidence based on the Mycin function and subject to the maximization of interval separation, as may be implemented in an interval separation maximization module 106. For example, the first row of the CE-Comp Column corresponds to case 7 and indicates a value 0.878.

That value is obtained by combining the appropriate numeric evidence values obtained from matrix 100 based on the aggregate function and further based on to the expert data designated by the experts for case 7. For example, since the "Credit Agency Ratings" for case 7 is "Very Good", then the numeric evidence value from matrix 100 is 0.151 and therefore the entry under the column labeled as Agency in the row for case 7 of matrix 102 is 0.151. Once the entire row of processing nodes for case 7 has been filled, then it can be shown that application of the aggregation function would result in a value of 0.878. Similar computations are performed for each of the examples supplied by the experts in spreadsheet 16 to obtain a corresponding aggregate value for each of such examples. To facilitate processing, each of such examples is grouped based on the linguistic output assigned by the expert. That is, whether the expert believes that the "Company Ratings" output from processing node 32 should be designated as "Very Good", "Good", etc. For example, within the bin or category of cases corresponding to "Very Good", maximization tool 106 can select the respective maximum and minimum values in that bin. Such values essentially determine the interval of output values corresponding to "Very Good". Similarly, within the bin or category of cases corresponding to "Good", maximization tool 106 can select the respective maximum and minimum values in that bin. Such values essentially determine the interval of output values corresponding to "Good". In the same manner, maximum and minimum aggregate values would be determined for any additional categories of cases, such as "Neutral", "Marginal, and "Weak". In the example illustrated in FIG. 9, assuming that the respective minimum and maximum aggregate values for all cases identified by the experts in bin 1, i.e., "Very Good" company ratings, is 0.5878 and 0.878 and further assuming that the respective minimum and maximum aggregate values for all cases identified by the experts in bin 2, i.e., "Good" company ratings, is −0.5139 and 0.5678 then the separation of that interval would be 0.02, that is, the difference of the minimum value in bin 1 cases and the maximum value in bin 2 cases. As suggested above, tool 106 may be configured not just to maximize the total separation between any adjacent intervals but to do so in a manner that that takes into account the spread of such separations by using a standard deviation measurement. As will be appreciated by those skilled in the art, a suitable scale factor may be used to appropriately adjust the weighing value of the standard deviation measurement relative to the total separation measurement. To ensure acceptable separation between any adjacent intervals, the optimization action may be further subject to a minimum separation value between such adjacent intervals.

Figure 10:
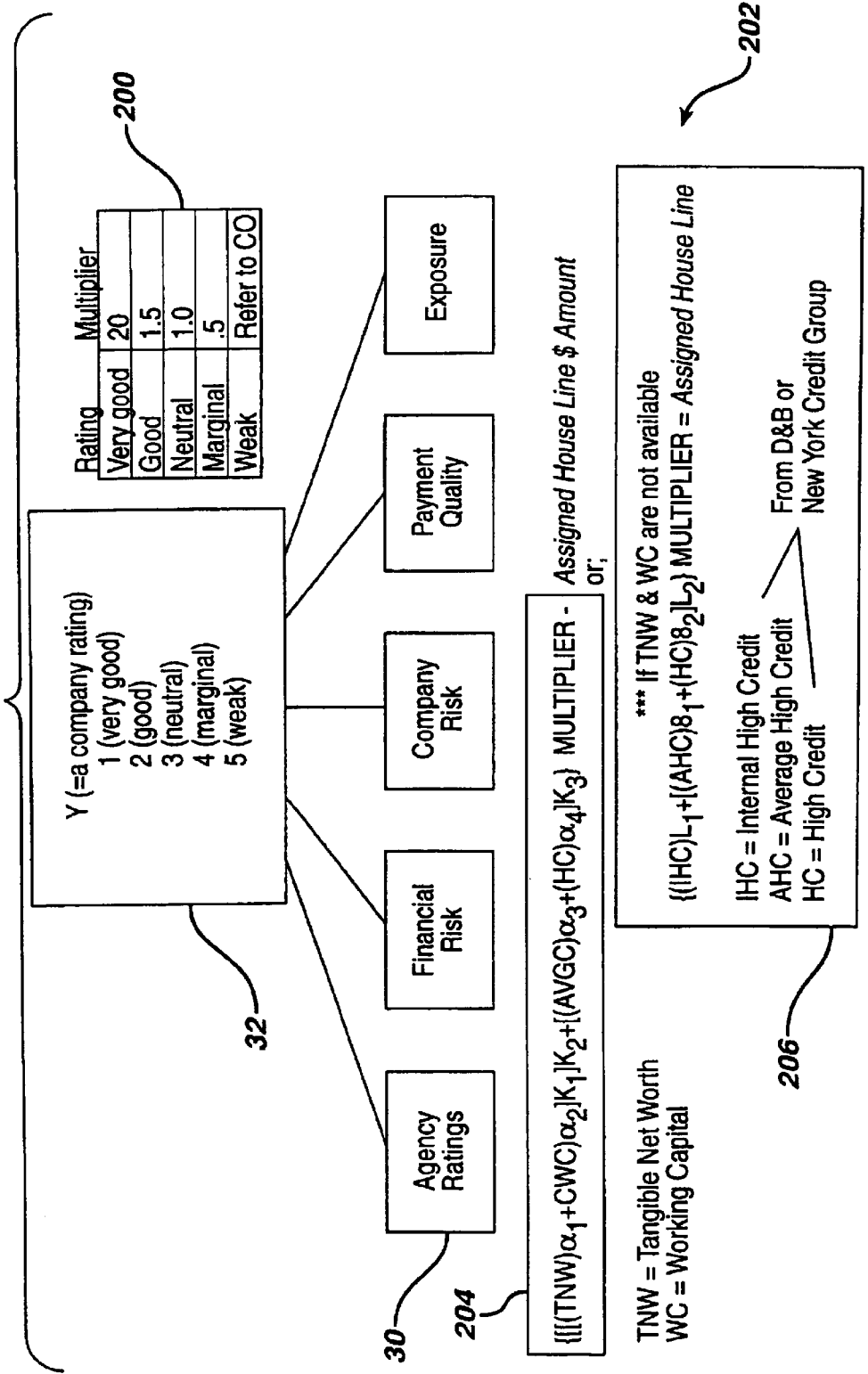
FIG. 10 illustrates exemplary credit-computing modules that may be used in conjunction with the data structure of FIG. 4 to assign a line of credit to a given applicant.

Once all the numeric evidence values have been determined, a computer model can be coded in any desired software language. The computer-based model will accept evidence values from the "leaves" or bottom nodes of the hierarchical structure and sequentially aggregate evidence until reaching the top or final node. As further explained below in the context of FIG. 10, the linguistic output of the top node is used in conjunction with experimentally and/or analytically derived mathematical relationships to generate an approved line of credit in dollars or any desired currency. For example, once the system has been developed, and deployed in the production stage, the system would output a particular "Company Ratings" output for any given credit line application. In one exemplary embodiment, the output from output processing node 32 can then be used to generate an adjusting factor. As shown in an adjusting factor look-up table 200, a "Very Good" company ratings output from processing node 32 may be associated with an adjusting factor having a value of two, for example. A "Good" company ratings output may be associated with an adjusting factor having a value of 1.5, for example. A "Neutral" company ratings output may be associated with an adjusting factor having a value of one, for example. A "Marginal" company ratings output may be associated with an adjusting factor having a value of 0.5, for example. A "Weak" company ratings output may be used to raise a warning signal that may require referral to a credit officer for further evaluation, for example.

The adjusting factor from look-up table 200 may be used by a credit line computing module 202 to adjust the credit line to be assigned to a given business entity. For example, assuming that Tangible Net Worth (TNW) and Working Capital (WC) for that entity are known, then the equation listed below would be executed in a first module 204 of computing module 202 to determine a base credit line that then would be adjusted by the adjusting factor from look-up table 200.

$$\text{Base\_Credit\_Line} = [(TNW)\alpha_1 + (WC)\alpha_2]K_1 + [(AVGHC)\alpha_3 + (HC)\alpha_4]K_3$$

$$\text{Assigned\_Credit\_Line} = \text{Base\_Credit\_Line} \times \text{Adjusting Factor}$$

wherein TNW=Tangible Net Worth; WC=Working Capital; AVGHC=Average High Credit; HC=High Credit; and $K_1$, $K_2$, $\alpha_1$–$\alpha_4$ represent empirically and/or experimentally derived weighing factors. Consistent with readily understood terminology by those of ordinary skill in the art, Tangible Net Worth refers to the difference between total tangible assets and liabilities of the applicant business entity. Working Capital refers to the difference between current assets and current liabilities. Average High Credit refers to the average amount of high credit provided to the applicant business entity by its creditors during a known period of time. For example, if out of a total of ten credit suppliers, each of nine suppliers has provided 10 units of high credit over the last year, and one of the ten suppliers has supplied 110 units of high credit over that same period, then the average high credit would be 20 units. High Credit refers to the highest amount of high credit provided to the applicant business entity by its creditors over a known period of time. In the foregoing example, the largest High Credit amount would be 110 units of credit.

For example, assuming that the base credit line result from the foregoing equation is $10,000, and further assuming that the output value from node 32 is "Very Good", then the $10,000 value would be upwardly adjusted to $20,000 since the adjusting factor in this case is equal to two. Once again, assuming that the base line result from that equation is $10,000, but now further assuming that the output value from node 32 is "Marginal", then the $10,000 value would be downwardly adjusted to $5,000 since the adjusting factor is equal to 0.5. In situations where the Tangible Net Worth (TNW) and Working Capital (WC) for that entity are unknown, the system provides a second module 206 in computing module 202 that could be used to determine the base credit line based on the following equation $$\text{Base\_Credit-Line} = (IHC)L_1 + [(AVGHC\gamma_1 + (HC)\gamma_2]L_2,$$

wherein IHC=Internal High Credit; AVGHC=Average High Credit; HC=High Credit; and $L_1$, $L_2$, $\gamma_1$, and $\gamma_2$ represent empirically and/or experimentally derived weighing factors. In this equation, Internal High Credit refers to the largest high credit provided over a known period of time by the financial service provider that is processing the application, e.g., the assignee of the present invention or equivalent. It will be appreciated that the latter equation presumes some pre-existing business relationship between the applicant and the financial service provider. Once again, the output from the evidential reasoning tool would be used to adjust the computed base credit line.

The mathematical technique for aggregating evidence in the system was discussed in detail in the context of FIG. 9 above and will not be repeated. It will be remembered, however, that at the development stage the "rules" for aggregating evidence at each node are determined by asking the experts to evaluate or map example situations. The examples presented are randomly selected situations from the potential combinations of linguistic values of the nodes being aggregated. These situations or examples are presented to the expert in the form of a spreadsheet 16 (FIG. 8) relating the examples to the node linguistics. As described in the context of FIG. 8, the spreadsheet shown therein is an example for the top-level nodes. The expert enters her opinion on the resultant "Company Rating" for each example. These examples are used to formulate the evidence aggregation "rules" for Company Rating. A similar procedure is followed for all nodes requiring evidence aggregation. As shown in FIG. 11, another useful feature of the present invention is a form of logic enforcement or verification. For example, once the system has been run to combine the various evidence values initially supplied by the experts. The system allows for focusing on expert opinions that upon closer examination can be shown to differ from the mapping generated by the majority of examples. That is, the system allows to identify such cases and suggest a new value in lieu of the value originally suggested by the expert. FIG. 11 shows two exemplary opinions that were changed. It will be appreciated that such changes should preferably be made in consultation with the experts to better ensure system accuracy and reliability. It is noted that during the development of the model, relatively few opinions required changing and the change was always a one "bin" change with which the experts concurred. The foregoing, is believed to reflect both on the initial superior quality of the expert opinion and the ability of the system to closely follow the supplied expert opinion.

Unknown Values of Evidence Data

Figure 12:
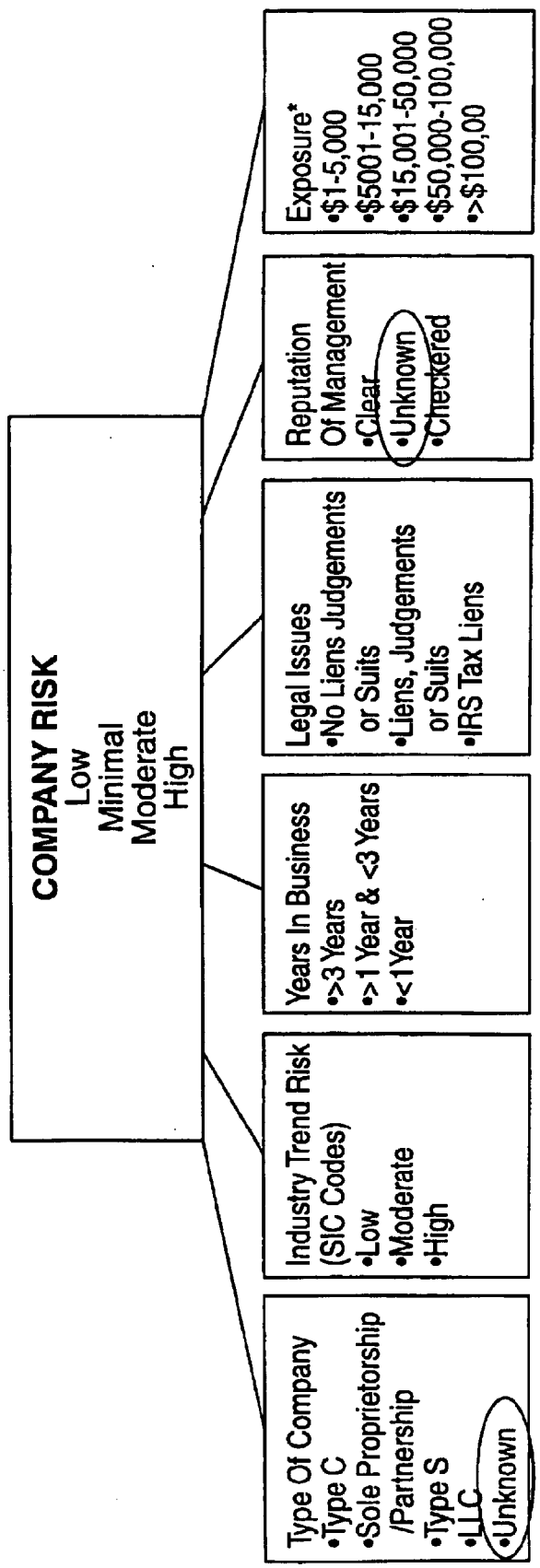
FIG. 12 shows an example of two processing nodes configured to process "Unknown" evidential values in accordance with one aspect of the present invention.

In another advantageous feature of the present invention, the design of the model anticipates situations where some underlying facts describing a credit line request may be unavailable, or fact-gathering cost, may be prohibitive to a given applicant, etc. In one exemplary embodiment, the system allows for incorporating the linguistic label "Unknown" and/or defining default values in predefined nodes of the system. This feature is particularly useful because it allows the model to systematically and accurately handle such situations. FIG. 12 shows an example of two processing nodes configured to process "Unknown" evidential values. For example, two of the input processing nodes coupled to the "Company Risk" processing node allow for "Unknown" values. For example, the "Type of Company" processing node includes as one of its possible attributes, the linguistic label "Unknown". Similarly, the "Reputation of Management" processing node includes the linguistic label unknown. In this case, experts are presented with examples that include situations where such values were unknown. Then, the experts, based on their expertise, rendered an opinion for each of those examples. Then, the system would process the expert opinion using the aggregate function and the separation optimization techniques discussed above. It will be appreciated that this feature is not simply adding the linguistic label "Unknown" but it involves statistically emulating the actions that an expert would take if certain facts were unknown. That is, it allows the system to reach a statistically reliable decision even in the absence of some input data, as an expert would in a less than ideal real world.

Figure 13:
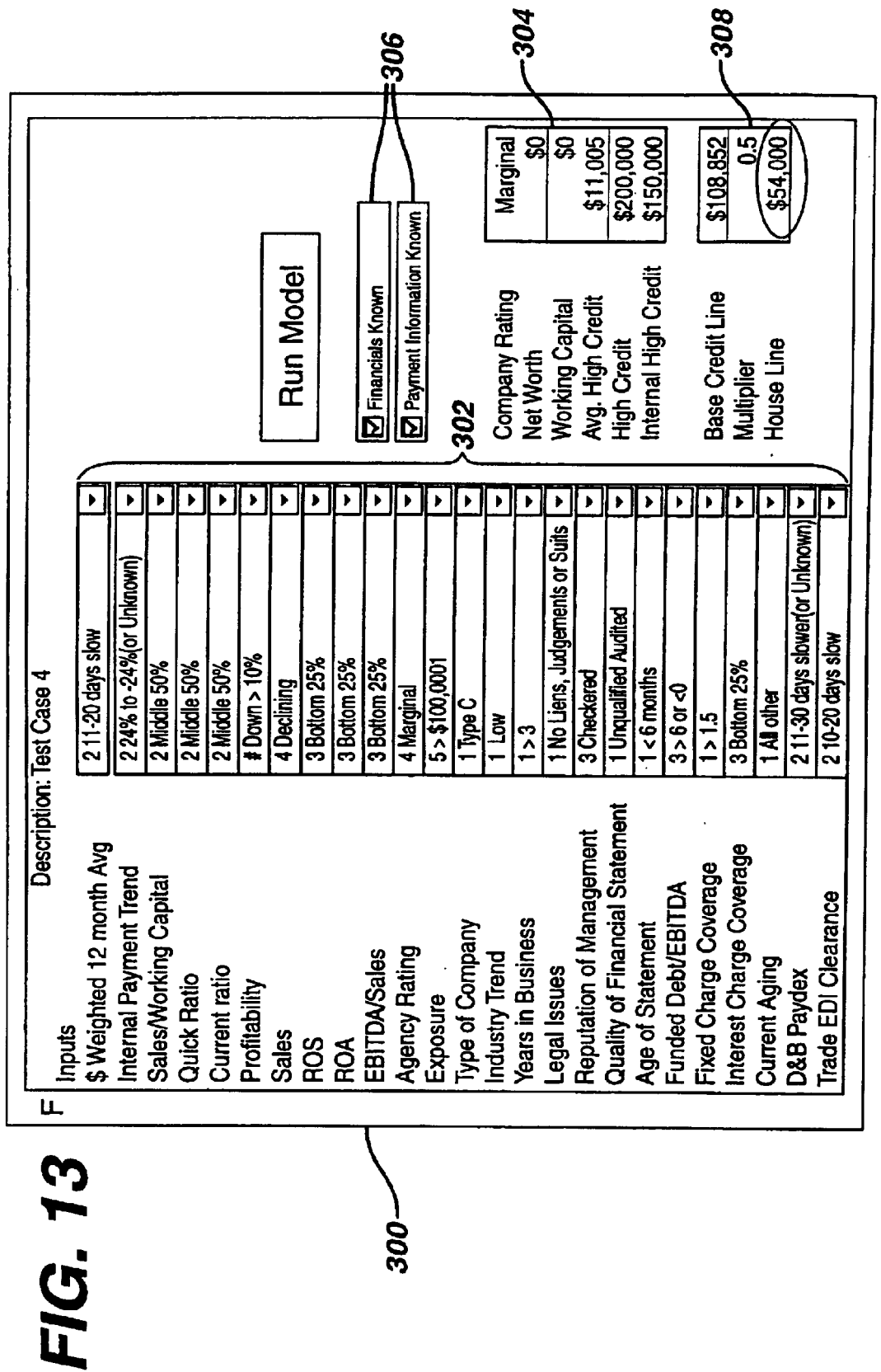
FIG. 13 illustrates an exemplary interface screen including a plurality of drop down menus to specify linguistic evidential data for each input processing node and to enter financial data into a plurality of input cells.

In one exemplary prototype implementation, a computer-based model structure was built using MS Excel as a desktop application to allow credit experts to test and validate the model's recommendations. As illustrated in FIG. 13, the prototype allowed the testers to input example cases through an interface 300 comprising a plurality of drop down menus 302 including the linguistic evidential inputs for each input processing node and a plurality of input cells 304 for financial data. Testers of the model could then readily select linguistic values for each processing node and input any suitable financial data to simulate actual credit requests. Clickable windows 306 allow the testers to check the model under various scenarios, such as scenarios where financial data of the requester was known, where that financial data was unknown, where payment information was known, or where payment information was unknown. The model results were made available on a suitable display window 308.

Figure 14:
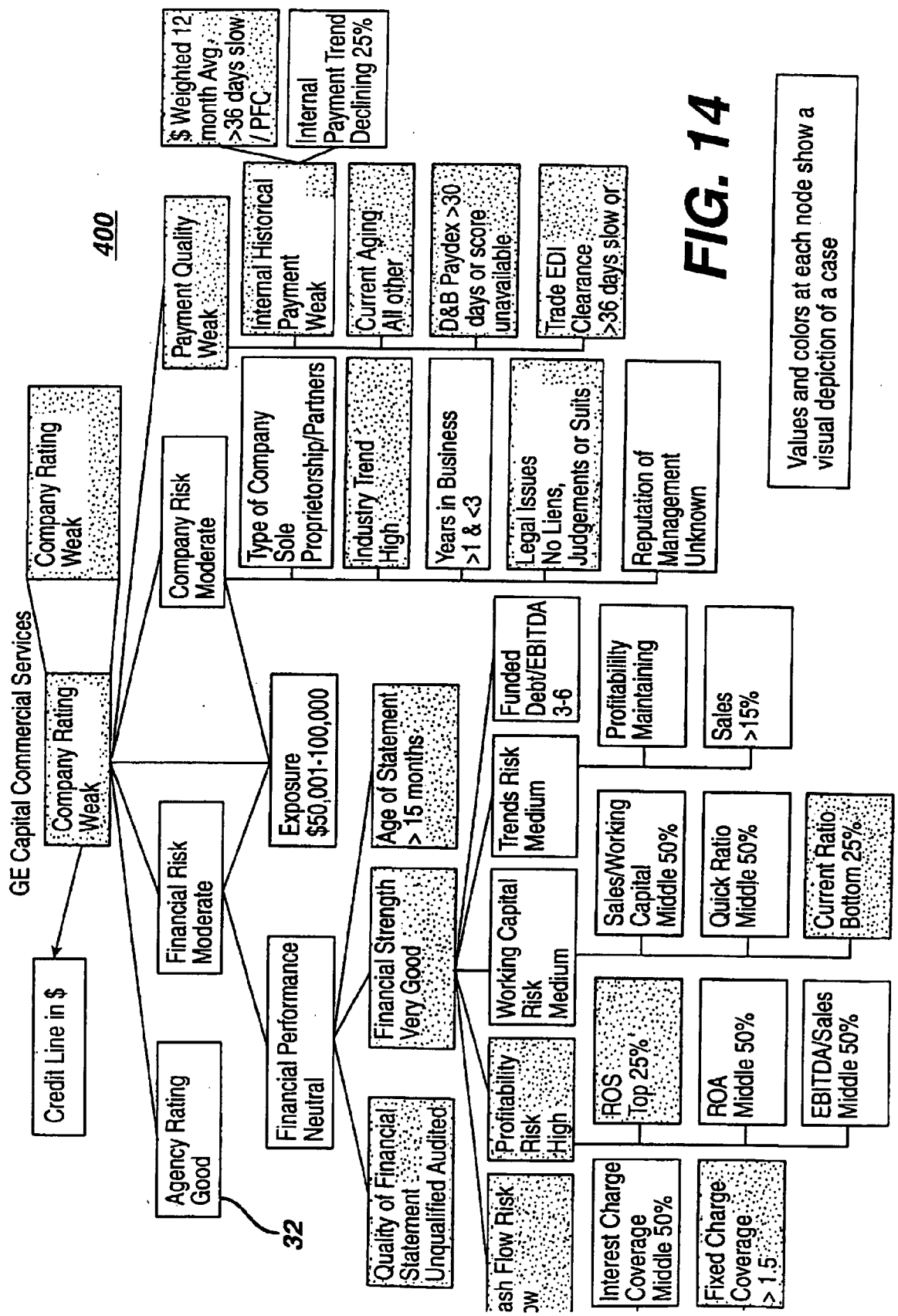
FIG. 14 illustrates a graphically encoded picture, e.g., a color-coded picture, of the model structure of FIG. 4, to enable users to get a more complete visual grasp of the model's performance.

To enable the testers to get a complete visual picture of the model's performance, a computer-readable graphical picture 400 of the tree structure is made available as shown in FIG. 14. Picture 400 may be configured to show the linguistic value at each node for the case processed. It will be appreciated that in the production phase such graphical picture could be displayed as a Web page accessible to remote authorized users over a global communications network, such as the Internet. It will be appreciated, that the processing nodes may be color coded for ease in identifying problematic spots. In yet another feature, as shown in FIG. 15, a report 500 may be generated describing the interrelationships of the intermediate processing nodes.

The present invention can be embodied in the form of computer-implemented processes and apparatus for practicing those processes. The present invention can also be embodied in the form of computer program code including computer-readable instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. When implemented on a computer, the computer program code segments configure the computer to create specific logic circuits or processing modules.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A computerized method for making decisions based on evidential reasoning, said method comprising:
providing a model structure including a plurality of processing nodes, each of said processing nodes coupled to receive a set of inputs to supply a respective output;
evaluating a respective attribute assigned to each of the plurality of processing nodes;
specifying a number of possible linguistic evidential values for each of said attributes, wherein said evidential values comprise known information;

statistically emulating a number of possible linguistic evidential values for each of said attributes, wherein said evidential values comprise unknown information;

processing said known and said unknown information at said processing nodes to generate the outputs; and combining the outputs supplied by said processing nodes to reach a decision that emulates expert data.

2. The computerized method of claim 1 wherein said model structure comprises a hierarchical model structure.

3. The computerized model of claim 2 wherein outputs from lower processing nodes are successively passed as inputs to higher level processing nodes until a final output is generated from the highest level processing node in the hierarchical model structure, said final output comprising said decision.

4. The computerized method of claim 1 wherein said expert data is collected during a learning stage from a plurality of examples far each of the processing nodes, each of the plurality of examples having a set of inputs, including some indicative of unknown information, and a corresponding output indicative of an expert opinion.

5. The computerized method of claim 4 wherein said plurality of examples is used during said learning stage to configure the processing nodes in the model structure to generate a final output from a given set of inputs, the model structure being configured so that said final output and the export opinion from the plurality of examples are statistically equivalent to one another.

6. The computerized method of claim 5 further comprising identifying expert opinion that deviates from a majority of the plurality of examples.

7. The computerized method of claim 6 further comprising adjusting said identified expert opinion to correct any deviations therein.

8. The computerized method of claim 7 further comprising reconfiguring the processing nodes to include any adjusted expert opinion.

9. The computerized method of claim 6 further comprising disregarding said identified expert opinion to remove any deviations therein.

10. The computerized method of claim 9 further comprising reconfiguring the processing nodes omitting any disregarded expert opinion.

11. The computerized method of claim 1 further comprising making the model structure available over a global communications network during a production stage for processing financial service applications.

12. A computerized method for making decisions based on evidential reasoning, said decisions used for risk and credit analysis of financial service applications, said method comprising:

providing a hierarchical model structure for performing risk and credit analysis of financial service applications, said model structure including at least one input layer of processing nodes, said model further including an output layer having a processing node coupled to each of the processing nodes in the input layer;

evaluating a respective attribute indicative of a risk factor assigned to each of the plurality of processing nodes;

specifying a number of possible linguistic evidential values for each of said attributes and wherein said evidential values comprise known financial information;

statistically emulating a number of possible linguistic evidential values for each of said attributes, wherein said evidential values comprise unknown financial information;

processing said known and said unknown information at said processing nodes to generate the outputs; and combining the outputs supplied by said processing nodes to reach a decision regarding a given financial service application that emulates expert data, wherein said expert data is collected during a learning stage from a plurality of examples for each of the processing nodes, each of the plurality of examples having a set of inputs, including some indicative of unknown financial information, and a corresponding output indicative of an expert opinion.

13. The computerized method of claim 12 wherein said plurality of examples comprises a plurality of hypothetical examples.

14. The computerized method of claim 12 wherein said plurality of examples comprises historical data from previously processed applications.

15. The computerized method of claim 12 wherein said plurality of examples is used during said learning stage to configure the processing nodes in the model structure to generate a final output from a set of inputs, the model structure being configured so that said final output and the expert opinion for the plurality of examples are statistically equivalent to one another.

16. The computerized method of claim 15 wherein said model structure is configured to provide a plurality of non-overlapping intervals over its possible output space, said model structure being further configured to optimize separation between any adjacent intervals of said possible output space so that said final output unambiguously maps into a single interval of said output space.

17. A computer-readable medium encoded with computer program code for making decisions based on evidential reasoning, said decisions used for risk and credit analysis of financial service applications, the program code causing a computer to execute a method comprising:

running a hierarchical model structure for performing risk and credit analysis of financial service applications, said model structure including at least one input layer of processing nodes, said model further including an output layer having a processing node coupled to each of the processing nodes in the input layer;

evaluating a receptive attribute indicative of a risk factor assigned to each of the plurality of processing nodes;

specifying a number of possible linguistic evidential values for each of said attributes and wherein said evidential values comprise known financial information;

statistically emulating a number of possible linguistic evidential values for each of said attributes, wherein said evidential values comprise unknown financial information:

processing said known and said unknown information at said processing nodes to generate the outputs; and combining the outputs supplied by said processing nodes to reach a decision regarding a given financial service application that emulates expert data, wherein said expert data is collected during a learning stage from a plurality of examples for each of the processing nodes, each of the plurality of examples having a set of inputs, including some indicative of unknown financial information, and a corresponding output indicative of an expert opinion, said model structure configured to provide a plurality of non-overlapping intervals over its possible output space, said model structure being further configured to optimize separation between any adjacent intervals of said possible output space so that its final output unambiguously maps into a single interval of said output space.

18. The computer-readable medium of claim 17 wherein said model structure is accessible in a production stage over a global communications network.

19. The computer-readable medium of claim 18 wherein said global communications network comprises the Internet.

20. A computerized system for making decisions based on evidential reasoning, said decisions used for risk and credit analysis of financial service applications, said system comprising:

memory configured to store a hierarchical model structure for performing risk and credit analysis of financial service applications, said model structure including at least one input layer of processing nodes, said model further including an output layer having a processing node coupled to each of the processing nodes in the input layer;

an evaluator module configured to evaluate a respective attribute indicative of a risk factor assigned to each of the plurality of processing nodes;

a data entry module configured to specify a number of possible linguistic evidential values for each of said attributes, wherein said evidential values comprise known financial information, and statistically emulate a number of possible linguistic evidential values for each of said attributes, wherein said evidential values comprise unknown financial information; and a processor configured to process said known and said unknown information at said processing nodes to generate outputs and combine the outputs supplied by said processing nodes to reach a decision regarding a given financial service application that emulates expert data, wherein said expert data is collected during a learning stage from a plurality of examples for each of the processing nodes, each of the plurality of examples having a set of inputs, including some indicative of unknown financial information, and a corresponding output indicative of an expert opinion.

\* \* \* \* \*

UNITED STATES PATENT AND TRADEMARK OFFICE
CERTIFICATE OF CORRECTION

PATENT NO.    : 6,951,008 B2
DATED         : September 27, 2005
INVENTOR(S)   : Quaile It is certified that error appears in the above-identified patent and that said Letters Patent is hereby corrected as shown below:

Column 15,
Line 18, should read -- plurality of examples for each of the processing nodes, each --.

Column 16,
Line 45, should read -- evaluating a respective attribute indicative of a risk factor --.

Signed and Sealed this

Third Day of January, 2006

JON W. DUDAS
*Director of the United States Patent and Trademark Office*